US010212028B1

(12) United States Patent
Sitaram et al.

(10) Patent No.: US 10,212,028 B1
(45) Date of Patent: Feb. 19, 2019

(54) CONTROLLING TDD CONFIGURATION BASED ON UPLINK LATENCY

(71) Applicant: Sprint Spectrum L.P., Overland Park, KS (US)

(72) Inventors: Krishna Sitaram, Chantilly, VA (US); Hemanth B. Pawar, Brambleton, VA (US); Chunmei Liu, Great Falls, VA (US); Pratik Kothari, Pune (IN)

(73) Assignee: Sprint Spectrum L.P., Overland Park, KS (US)

( * ) Notice: Subject to any disclaimer, the term of this patent is extended or adjusted under 35 U.S.C. 154(b) by 104 days.

(21) Appl. No.: 15/365,387

(22) Filed: Nov. 30, 2016

(51) Int. Cl.
*H04W 72/08* (2009.01)
*H04W 88/02* (2009.01)
*H04L 12/24* (2006.01)
*H04L 12/26* (2006.01)
*H04L 5/14* (2006.01)
*H04M 7/00* (2006.01)

(52) U.S. Cl.
CPC .............. *H04L 41/08* (2013.01); *H04L 5/14* (2013.01); *H04L 41/12* (2013.01); *H04L 43/0852* (2013.01); *H04L 43/16* (2013.01); *H04M 7/006* (2013.01); *H04W 72/085* (2013.01); *H04W 88/02* (2013.01)

(58) Field of Classification Search
CPC ........................... H04W 72/10; H04W 72/042
USPC ................................... 370/252–478
See application file for complete search history.

(56) References Cited

U.S. PATENT DOCUMENTS

| 9,220,085 | B2 * | 12/2015 | He | H04J 3/00 370/280 |
| 2010/0290370 | A1 * | 11/2010 | Li | H04W 72/04 370/280 |
| 2015/0092631 | A1 | 4/2015 | Meng et al. | |
| 2016/0353475 | A1 * | 12/2016 | Au | H04W 72/12 370/252 |

* cited by examiner

*Primary Examiner* — Iqbal Zaidi (57) ABSTRACT

Disclosed is a method and system for controlling air interface communication in a wireless communication system that supports multiple TDD configurations. In a disclosed example, a base station's cell is initially configured to operate with a particular TDD configuration. The base station then detects a trigger to reduce uplink latency in the cell, such as by detecting a threshold number of devices being served with latency-sensitive communication such as voice-over-packet communication. And the base station responsively reconfigures the cell to operate with a different TDD configuration having lower uplink latency, where uplink latency of each TDD configuration is based average wait to uplink subframe of the TDD configuration.

17 Claims, 5 Drawing Sheets

Fig. 1

| TDD Configuration | Subframe Number ||||||||||
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | D | U | U | U | D | S | U | U | D |

Fig. 2

| TDD Configuration | Subframe Number |||||||||| Uplink Latency |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | |
| Delay values | 2 | 1 | 0 | 0 | 0 | 2 | 1 | 0 | 0 | 0 | 0.6 |
| 1 | D | S | U | U | D | D | S | U | U | D | |
| Delay values | 2 | 1 | 0 | 0 | 3 | 2 | 1 | 0 | 0 | 3 | 1.2 |
| 2 | D | S | U | D | D | D | S | U | D | D | |
| Delay values | 2 | 1 | 0 | 4 | 3 | 2 | 1 | 0 | 4 | 3 | 2.0 |
| 3 | D | S | U | U | U | D | D | D | D | D | |
| Delay values | 2 | 1 | 0 | 0 | 0 | 7 | 6 | 5 | 4 | 3 | 2.8 |
| 4 | D | S | U | U | D | D | D | D | D | D | |
| Delay values | 2 | 1 | 0 | 0 | 8 | 7 | 6 | 5 | 4 | 3 | 3.6 |
| 5 | D | S | U | D | D | D | D | D | D | D | |
| Delay values | 2 | 1 | 0 | 9 | 8 | 7 | 6 | 5 | 4 | 3 | 4.5 |
| 6 | D | D | U | U | U | D | S | U | U | D | |
| Delay values | 2 | 1 | 0 | 0 | 0 | 2 | 1 | 0 | 0 | 3 | 0.9 |

CONTROLLING TDD CONFIGURATION BASED ON UPLINK LATENCY

BACKGROUND

A typical wireless communication system includes one or more base stations, each radiating to define one or more cells in which wireless client devices (WCDs) such as cell phones, gaming devices, tablet computers, tracking devices, embedded wireless modules, and other wirelessly equipped devices can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a WCD within coverage of the system may thus engage in air interface communication with a base station and thereby communicate via the base station with various remote network entities or with other WCDs served by the system.

Such a system may operate in accordance with a particular air interface protocol or radio access technology (RAT), with communications from a base station to WCDs defining a downlink or forward link and communications from the WCDs to the base station defining an uplink or reverse link. Examples of existing air interface protocols include, without limitation, Long Term Evolution (LTE) (using Orthogonal Frequency Division Multiple Access (OFDMA) on the downlink and Single Carrier Frequency Division Multiple Access (SC-FDMA) on the uplink), Code Division Multiple Access (CDMA) (e.g., 1×RTT and 1×EV-DO), Global System for Mobile Communication (GSM), WI-FI, and BLUETOOTH. Each protocol may define its own procedures for registration of WCDs, initiation of communications, handover between cells, and other functions related to air interface communication.

In accordance with the air interface protocol, each of the one or more cells of the system may operate on a respective carrier, which could be frequency division duplex (FDD) or time division duplex (TDD), defining one or more frequency channels each typically within an industry standard frequency band. An FDD carrier defines separate frequency channels for downlink and uplink communication, so that WCDs can engage in downlink and uplink communication. Whereas, a TDD carrier defines a frequency channel multiplexed over time (e.g., on a recurring basis) between downlink and uplink use, so that WCDs can engage in downlink communication in only particular time intervals and uplink communication in only other time intervals.

Each carrier in such a system may also define a number of sub-channels for carrying information between the base station and WCDs. For instance, each carrier may define a pilot channel, reference channel or other resource on which the base station can broadcast a reference signal or the like that WCDs may detect as an indication of coverage and may measure to evaluate coverage. Further, each carrier may define various other downlink and uplink control channels and traffic channels for carrying control signal and bearer traffic between the base station and WCDs.

When a WCD initially enters into coverage of a wireless communication system (e.g., powers on in coverage of the system), the WCD may scan for a strongest (e.g., highest signal-to-noise ratio) reference signal, defining a strongest cell. Further, the WCD may read system information broadcast from the base station that provides the cell and may engage in a process to register itself to be served by the base station and generally by the system. In this process, for instance, the WCD and base station may first engage in signaling to establish a radio-link-layer connection between the WCD and the base station, the WCD may transmit an attach request or the like, and the base station and/or supporting infrastructure may authenticate and authorize the WCD for service, and establish a record indicating where in the system the WCD is operating. The WCD may then be served by the base station in an idle mode or a connected mode.

OVERVIEW

In a system that supports TDD operation, each cell that operates on a TDD carrier would be configured with a specific recurring sequence of downlink and uplink time segments defining a TDD configuration of the cell. By way of example, an LTE cell operating on a TDD carrier could define a continuum of 10-millisecond frames each divided into ten 1-millisecond subframes, and the cell could have a TDD configuration that defines which of the subframes per frame are for downlink communication and which of the subframes per frame are for uplink communication. (Further, the TDD configuration could also designate certain subframes as transitional or "special" subframes to facilitate transition from downlink to uplink communication.)

One unfortunate issue with multiplexing downlink and uplink subframes in this manner is that it can limit throughput, since neither downlink nor uplink communication could occur in every subframe of a frame. In some systems, this throughput limitation could be offset in part by defining wider carrier frequency bandwidth so as to support a greater extent of data communication per subframe.

However, even with wider carrier bandwidth, another issue with the TDD arrangement is that it can create uplink communication latency. In particular, as WCDs are typically power limited, it may be impractical for a WCD to engage in extensive data transmission at once, such as in a single uplink subframe. Rather, it would be preferable for the WCD to spread its data transmission over multiple subframes. Yet, by definition, the TDD arrangement could introduce delay between those uplink subframes. Therefore, the TDD arrangement could delay the WCD's uplink transmission, which could be especially problematic if the WCD is engaged in latency-sensitive communications such as a voice-over-packet call or the like.

The present disclosure addresses a scenario where a wireless communication system supports various possible TDD configurations, and the disclosure provides for dynamically configuring a cell with a particular TDD configuration that is selected based on a measure of uplink latency. In particular, each TDD configuration is deemed to have a respective measure of uplink communication latency that is based on an average wait to uplink subframe. For instance, the uplink latency measure for a given TDD configuration could be computed by (i) determining for each subframe of the TDD configuration a duration in the TDD configuration until an uplink subframe, and (ii) averaging those determined durations.

In accordance with the disclosure, a base station's cell would initially be configured to operate with a particular TDD configuration, having an associated uplink latency measure defined based on an average wait to uplink subframe. In that state of operation, the base station would then face a situation where it would be useful to help reduce or minimize uplink latency in the cell. For instance, the base station could detect that it is serving a threshold great number of voice-over-packet calls or other latency sensitive communication sessions in the cell. According to the disclosure, the base station could then respond to that situation by automatically changing the cell's TDD configuration to one that has a lower uplink latency measure than its current TDD configuration, thus helping to reduce or minimize uplink latency in the cell.

Accordingly, in one respect, disclosed is method for controlling air interface communication in a base station's cell, where the cell operates with a first TDD configuration defining a first sequence of uplink and downlink subframes for communication between the base station and WCDs operating in the cell. The method includes detecting a trigger for reducing uplink latency in the cell. And the method then includes, responsive to detecting the trigger, (i) selecting a second TDD configuration based on the second TDD configuration having lower uplink latency than the first TDD configuration, wherein the uplink latency of each TDD configuration is based on average wait to uplink subframe of the TDD configuration, and (ii) reconfiguring the cell to operate with the second TDD configuration instead of the first TDD configuration.

In another respect, disclosed is a method for controlling air interface communication in a wireless communication system, where the wireless communication system includes a base station and supports at least seven distinct TDD configurations each defining a respective sequence of uplink and downlink subframes per recurring air interface frame. According to the method, the base station operates with a first one of the TDD configurations. When operating with the first TDD configuration, the base station then detects that at least a predefined threshold number of WCDs served by the base station are each engaged in a voice-over-packet call and each have threshold poor uplink channel quality. And responsive to detecting that trigger condition, the base station then (i) selects a second one of the TDD configurations to operate with in place of the first TDD configuration and (ii) transitions from operating with the first TDD configuration to operating with the selected second TDD configuration. In line with the discussion above, the selection of the second TDD configuration in this method is based on the second TDD configuration having a lower uplink latency than the first TDD configuration, where the uplink latency per TDD configuration is based on an average wait to uplink subframe of the TDD configuration.

Further, in another respect, disclosed is a base station configured to control air interface communication. The base station includes an antenna structure and transceiver cooperatively configured to provide a cell in which to serve WCDs, where the cell operates with a first TDD configuration defining a first sequence of uplink and downlink subframes for communication between the base station and one or more WCDs that would operate in the cell. And the base station includes a controller (e.g., a processing unit programmed with instructions) operable to detect a trigger for reducing uplink latency in the cell and, responsive to detecting the trigger, to (i) select a second TDD configuration based on the second TDD configuration having lower uplink latency than the first TDD configuration, wherein the second TDD configuration defines a second sequence of uplink and downlink subframes for communication between the base station and one or more WCDs that would operate in the cell, the second sequence being different than the first sequence, and wherein the uplink latency of each TDD configuration is based on average wait to uplink subframe, and (ii) reconfigure the cell to operate with the second TDD configuration instead of the first TDD configuration.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Features of the present disclosure will be described by way of example in the context of LTE. However, it will be understood that principles of the disclosure can extend to apply in other scenarios as well, such as with respect to other air interface protocols, other TDD configurations and the like. Further, numerous variations from the details disclosed may be possible. For instance, elements, arrangements, and operations may be added, removed, combined, distributed, or otherwise modified. In addition, operations described as being performed by one or more entities may be implemented in various ways, such as by a processing unit executing program instructions for instance.

Figure 1:
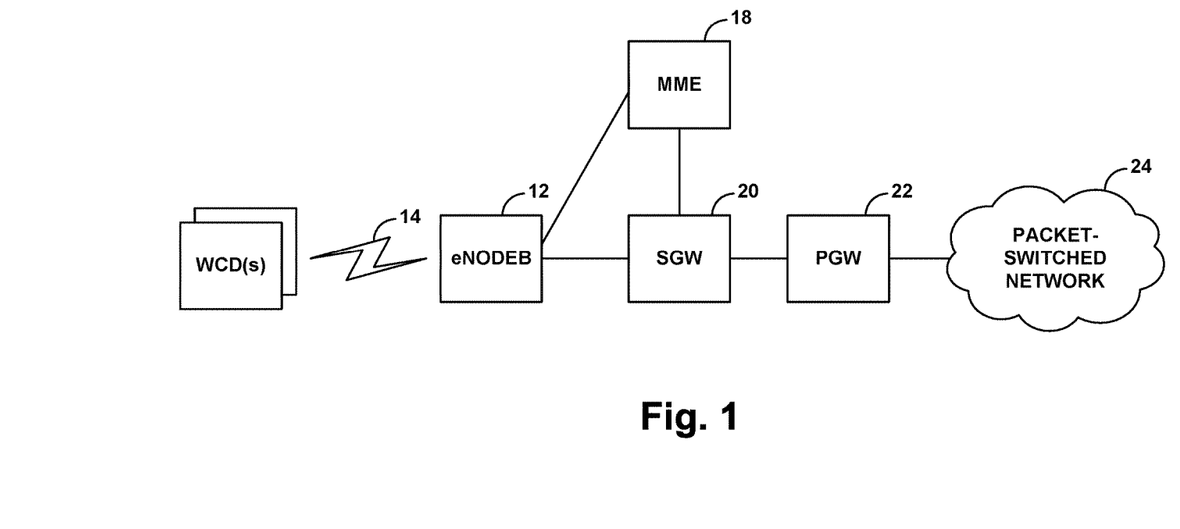
FIG. 1 is a simplified block diagram of an example wireless communication system in which features of the present disclosure can be implemented.

Referring to the drawings, as noted above, FIG. 1 is a simplified block diagram of a wireless communication system in which the various features of the present disclosure can be implemented. In particular, FIG. 1 depicts a representative LTE network 10, which functions primarily to serve WCDs with wireless packet data communication service, including possibly voice-over-packet service, but may also serve other functions.

As shown, the LTE network includes a base station (eNodeB) 12, which could include an antenna structure and transceiver that cooperatively work to provide an LTE cell 14 in which to serve WCDs 16. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

In a representative implementation, cell 14 operates on a TDD carrier that has a defined frequency bandwidth within a particular band. For example, the TDD carrier could have a 20 MHz bandwidth and could reside within LTE Band 41

(2496-2690 MHz), or the carrier could take other forms or be located within other bands. As shown, the air interface of cell 14 then defines a downlink interface 26 and an uplink interface 28, which are multiplexed over time in accordance with a TDD configuration of the cell.

Pursuant to LTE, the air interface of cell 14 is divided over time into a continuum of 10-millisecond frames each made up of ten 1-millisecond subframes, and the TDD configuration designates each subframe as either a downlink subframe, an uplink subframe, or a special (transitional) subframe. Further, each subframe is divided over time into 0.67-microsecond symbol time segments, and the carrier bandwidth is divided over frequency into 15 kHz subcarriers. Thus, the air interface effectively defines an array of resource elements, each spanning 0.67 microseconds and occupying a 15 kHz subcarrier, and each such resource element could be used to carry modulated data.

LTE then defines particular channels made up of groups of these resource elements. For instance, on the downlink, certain resource elements are set aside to define a physical downlink control channel (PDCCH) for carrying scheduling directives and other control signaling from the eNodeB to WCDs, other resource elements are set aside to define a physical downlink shared channel (PDSCH) for carrying scheduled downlink data communication, and still other resource elements are set aside to define a reference channel for carrying a reference signal that WCDs can monitor to evaluate coverage quality. Further, certain resource elements in certain subframes per frame are set aside to carry special broadcast signals, such as synchronization signals and system information messages. Whereas, on the uplink, certain resource elements are set aside to define a physical uplink control channel (PUCCH) for carrying scheduling request and other control signaling from WCDs to the eNodeB, and other resource elements are set aside to define a physical uplink shared channel (PUSCH) for carrying scheduled uplink data communication.

In practice, when a WCD enters into coverage of the eNodeB, the WCD may detect the eNodeB's coverage, and the WCD and eNodeB may then engage in a process to register the WCD to be served by the eNodeB in cell 14. For instance, the WCD and eNodeB may engage in access and Radio Resource Control (RRC) signaling to establish a radio-link layer connection between the WCD and the eNodeB. And the WCD may then transmit via that connection an attach request seeking to register for service with the LTE network and to be served by the eNodeB, which the eNodeB may forward that attach request to the MME for processing.

Upon receipt of the WCD's attach request, the MME may then engage in a process to authenticate the WCD, and the MME may coordinate setup of one or more bearers to support communication of packet data to and from the WCD. Further, the MME, eNodeB, and other associated entities may create and maintain a record of each such bearer, along with other WCD service information.

Each such bearer may extend as a virtual tunnel between the WCD and the PGW, including a radio bearer portion over the air interface and an access bearer portion within the core network. Further, each such bearer may have an associated quality of service class, to support a particular class of data communication. By way of example, the MME could set up for the WCD a general packet-bearer for carrying basic Internet communications and the like. And if the WCD supports packet-based real-time communication service such as voice-over-packet service for instance, the MME could set up for the WCD an Internet Multimedia Subsystem (IMS) signaling bearer for carrying session setup signaling between the WCD and an IMS platform.

Once a WCD is so attached with the eNodeB, the eNodeB may then provide the WCD with packet-data communication service, scheduling transmission of packet-data in both the downlink and uplink directions.

In the downlink direction, as data arrives at the PGW for transmission to the WCD, the data may pass via the SGW to the eNodeB, and the eNodeB may then schedule transmission of the data on PDSCH resources. In particular, the eNodeB may assign particular PDSCH resources to carry the data, the eNodeB may transmit to the WCD on the PDCCH a downlink control information (DCI) message specifying the assigned PDSCH resources, and the eNodeB may transmit the data to the WCD on the assigned PDSCH resources.

Likewise, in the uplink direction, as the WCD has data to transmit via the PGW, the WCD may transmit a scheduling request to the eNodeB, and the eNodeB may then schedule transmission of the data on PUSCH resources. In particular, the eNodeB may assign particular PUSCH resources to carry the data, the eNodeB may transmit to the WCD on the PDCCH a DCI message specifying the assigned PUCCH resources, and the WCD may then transmit the data to the WCD on the assigned PUSCH resources.

When WCDs are so served by the eNodeB, the WCDs may engage in various types of packet-data communications, depending on the WCDs' capabilities and other factors. By way of example, WCDs may engage in general packet-data communications such as web browsing, e-mail communication, and file transfer, and WCDs may engage in real-time packet-data communications such as voice-over-packet communication, streaming video communication, gaming communication or the like.

Further, to support such real-time communication, the MME may coordinate setup and teardown of dedicated guaranteed-bit-rate (GBR) bearers, and the eNodeB may correspondingly update its WCD context records. For example, when a WCD engages in IMS signaling via its IMS bearer to set up a voice-over-packet call, the MME may coordinate setup of a voice-over-packet GBR bearer to carry the voice call traffic to and from the WCD, and the eNodeB may update its context record for the WCD to indicate the existence of that voice-over-packet bearer; and when the voice-over-packet call ends, the MME may then coordinate tear down of that bearer, and the eNodeB may accordingly update its context record for the WCD. Similar processing may also occur for other types of real-time packet-data communications.

In general, when an eNodeB is serving WCDs with these or other types of communications, it may be desirable for the eNodeB to help minimize latency of the communications. This is particularly the case for any communications that are latency-sensitive, such as communications that could be degraded if subject to excessive end-to-end delay. Without limitation, examples of such communications are the real-time packet-data communications mentioned above. For instance, voice-over-packet communication may have a maximum tolerable end-to-end delay of about 200 milliseconds, and other forms of real-time packet-data communications may have similar delay tolerances. Further, as discussed above, this latency issue may be especially problematic for uplink communications. To the extent the eNodeB can help reduce or minimize uplink latency of these or other communications, the eNodeB could thus help improve communication quality and overall network performance.

As discussed above, the present disclosure provides for reducing uplink latency in a cell by dynamically controlling the TDD configuration of the cell. This process can apply in a wireless communication system that supports at least three distinct TDD configurations, each having a respective measure of uplink latency that is based on an average wait to uplink subframe of the TDD configuration. In such a system, an base station could detect a trigger for reducing uplink latency in its cell, and the base station could then responsively change the TDD configuration of the cell to one that has a reduced measure of uplink latency.

Figure 2:
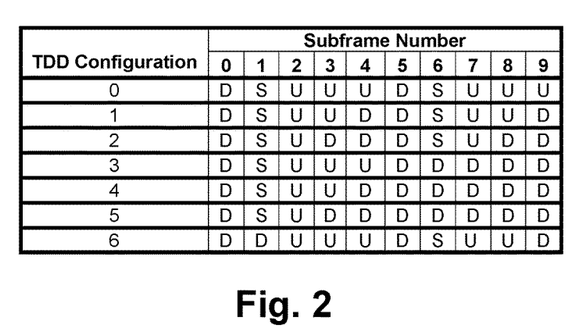
FIG. 2 is a depiction of example TDD configurations.

The LTE standard specifies seven supported TDD configurations, numbered 0 through 6. FIG. 2 illustrates these TDD configurations. As shown, each TDD configuration defines a distinct sequence of downlink and uplink subframes per LTE frame. More particularly, in each TDD configuration, each subframe of the 10-millisecond LTE frame is designated as either a downlink subframe (D), an uplink subframe (U), or a special subframe. A downlink subframe is reserved for downlink use, an uplink subframe is reserved for uplink use, and a special subframe could serve to provide transition from downlink to uplink, possibly having a starting portion be for downlink use, a guard period with no use, and then an ending portion for uplink use.

In practice, an eNodeB could broadcast in the cell an overhead system parameter message that specifies the TDD configuration of the cell, and WCDs operating in the cell could read that message to determine the TDD configuration of the cell and could then operate accordingly. For example, the eNodeB could broadcast a System Information Block #1 (SIB1) message that includes a "tdd-Config" block specifying the TDD configuration number (such as one of those shown in FIG. 2). A WCD operating in that cell could thus read that SIB1 message to determine the TDD configuration. Further, the WCD could read periodic re-broadcasts of the SIB1 message to detect any change of TDD configuration of the cell and could also operate accordingly.

In accordance with the present disclosure, each of these TDD configurations has an uplink latency measure that is based on an average wait to uplink subframe across the subframes of the configuration. The theory here is that, when a WCD has data that is ready to transmit (e.g., ready for output from the WCD's transmit queue), a delay from that moment until occurrence of an uplink subframe in the TDD configuration in use is reasonably representative of how long of a wait there could be for transmission of the data. In practice, the actual assignment of PUCSH resources and thus determination of which uplink subframes to use for transmission would be based on a possibly complex eNodeB scheduling algorithm. But the average delay until occurrence of uplink subframe could be a statistically relevant measure of uplink latency for the TDD configuration.

To compute this measure of uplink latency for a given TDD configuration, a delay value can be assigned to each subframe based on what the wait is at that subframe until the occurrence of an uplink subframe, and the assigned delay values of the subframes in the configuration could be averaged to establish a measure of uplink latency of the configuration. The eNodeB could compute these uplink latency measures per supported TDD configuration or could be programmed with indicia of the measures per supported TDD configuration.

In this process, if the subframe itself is an uplink subframe, then the assigned delay could be 0 milliseconds. Whereas, if the subframe is not an uplink subframe, then the assigned delay could be a number of milliseconds equal to how far away the next uplink subframe is in the configuration (possibly within the same frame or possibly extending to a next instance of the frame). Further, the process could treat special subframes as not being uplink subframes. Alternatively, if the next uplink time segment defined by the configuration would be the uplink portion of a special subframe, the process could assign a delay based on how long it will be until that uplink portion of the special subframe.

Figure 3:
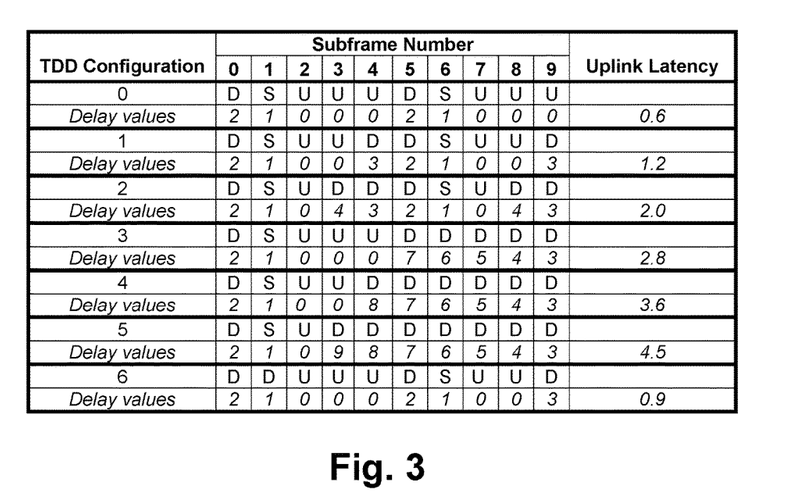
FIG. 3 is the depiction of FIG. 2 supplemented with example delay values per subframe and with example uplink latency measures per TDD configuration.

FIG. 3 depicts the seven standard TDD LTE configurations of FIG. 2 and further shows example assigned delay values per subframe of each configuration and shows the average of these delay values, defining or being a basis for an uplink latency measure per TDD configuration. As shown in FIG. 3, for instance, the delay values assigned to the subframes of TDD configuration 0 are {2, 1, 0, 0, 0, 2, 1, 0, 0, 0}, and the average of these delay values, serving as an example uplink latency measure for that TDD configuration, is 0.6. Whereas, the delay values assigned to subframe configuration 1 are {2, 1, 0, 0, 3, 2, 1, 0, 0, 3}, and the average of these delay values, as an example uplink latency measure for that TDD configuration, is 1.2. And the delay values assigned to subframe configuration 2 are {2, 1, 0, 4, 3, 2, 1, 0, 4, 3}, and the average of these delay values, as an example uplink latency measure for that TDD configuration, is 2.0.

Note that having the uplink latency measure per TDD configuration be based on an average wait to uplink subframe of the TDD configuration is different than merely considering how many uplink subframes there are in the TDD configuration. For example, as shown in FIG. 3, TDD configurations 2 and 4 each have just two uplink subframes. But the uplink latency measures of these TDD configurations, using the process described above for instance, are 2.0 and 3.6 respectively, as they have different average waits to uplink subframe.

In accordance with the present disclosure, an eNodeB's cell could be initially configured to operate with a particular TDD configuration. And the eNodeB could then detect a trigger for reducing uplink latency in the cell. For instance, the eNodeB could detect based on its context records or based on other factors (such as deep packet inspection or other evaluation) that the eNodeB is currently serving at least a threshold predefined number of latency-sensitive communication sessions, such as voice-over-packet calls. The threshold could be set by engineering design to a level that represents a situation where reducing uplink latency would be desirable. For instance, the threshold could be set to ten or another such number.

Upon detecting such a trigger, the eNodeB could then select another one of the TDD configurations based on the other TDD configuration having a lower measure of uplink latency than the eNodeB's current TDD configuration. For instance, the eNodeB could select the TDD configuration that has the lowest such measure. Further, in an example implementation, the eNodeB could be pre-programmed with an indication of the TDD configuration to which the eNodeB should switch the cell in this situation, and the eNodeB could thus automatically switch the cell to that TDD configuration.

And the eNodeB could then reconfigure the cell to operate with the selected other TDD configuration instead of the TDD configuration the cell was operating with. For example, the eNodeB could specify in its SIB1 broadcast message an indication of the new TDD configuration of the cell, and WCDs in the cell could programmatically read that message to determine the TDD configuration. Alternatively or additionally, the eNodeB could unicast messages such as RRC connection reconfiguration messages to served WCDs, indicating the change of TDD configuration of the cell. The eNodeB and any WCDs in the cell could then operate accordingly with the new TDD configuration.

Figure 4:
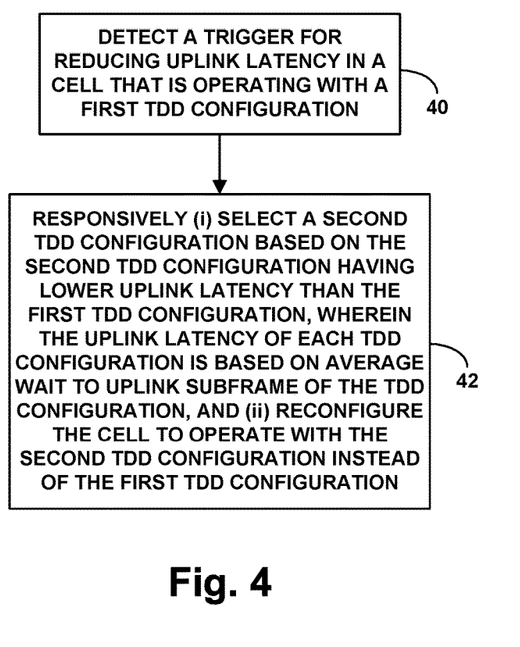
FIG. 4 is a flow chart depicting operations that can be carried out in accordance with the disclosure.

FIG. 4 is next a flow chart depicting operations that could be carried out in accordance with an example method for controlling air interface communication in a base station's cell, where the cell operates with a first TDD configuration defining a first sequence of uplink and downlink subframes for communication between the base station and WCDs operating in the cell. This method could be carried out by the base station and/or by one or more other entities.

As shown in FIG. 4, at block 40, the method includes detecting a trigger for reducing uplink latency in the cell. And at block 42, the method then includes, responsive to detecting the trigger, (i) selecting a second TDD configuration based on the second TDD configuration having lower uplink latency than the first TDD configuration, wherein the uplink latency of each TDD configuration is based on average wait to uplink subframe of the TDD configuration, and (ii) reconfiguring the cell to operate with the second TDD configuration instead of the first TDD configuration.

In line with the discussion above, the act of detecting the trigger for reducing uplink latency in the cell could involve detecting at least a predefined threshold level of latency-sensitive communication in the cell, such as detecting at least a predefined threshold number of voice-over-packet calls being served in the cell.

Moreover, the act of detecting the trigger for reducing uplink latency in the cell could involve detecting that the base station is serving at least a predefined threshold number of WCDs that are engaged in voice-over-packet service and that have channel quality lower than a predefined threshold channel quality (e.g., per a threshold set by engineering design to represent poor channel quality)—as such WCDs may be particularly susceptible to uplink latency issues. To facilitate this, for instance, the base station could monitor uplink signal strength (e.g., signal-to-noise ratio) of communications from WCDs and could record these measurements in the WCD context records. Thus, by reference to the WCD context records, the eNodeB could determine how many served WCDs are engaged in voice-over-packet service (e.g., which WCDs have assigned voice-over-packet bearers) and have threshold low channel quality.

As discussed above, the base station in this method could operate according to an air interface protocol that defines at least three distinct TDD configurations, in which case the first TDD configuration and second TDD configuration could each be one of the at least three distinct TDD configurations. By way of example, the air interface protocol could be LTE, which defines seven distinct TDD configurations as noted above, in which case the first and second TDD configurations could each be one of those seven TDD configurations.

And as further discussed above, the base station could be provisioned with data that indicates respectively for each of the TDD configurations a measure of the uplink latency of the TDD configuration, in which case the act of selecting the second TDD configuration could be based on a comparison of the indicated measure of uplink latency of the second TDD configuration with the indicated measure of uplink latency of the first TDD configuration. More particularly, the selecting could be based on the second TDD configuration having a lowest indicated measure of uplink latency of all of the TDD configurations.

Figure 5:
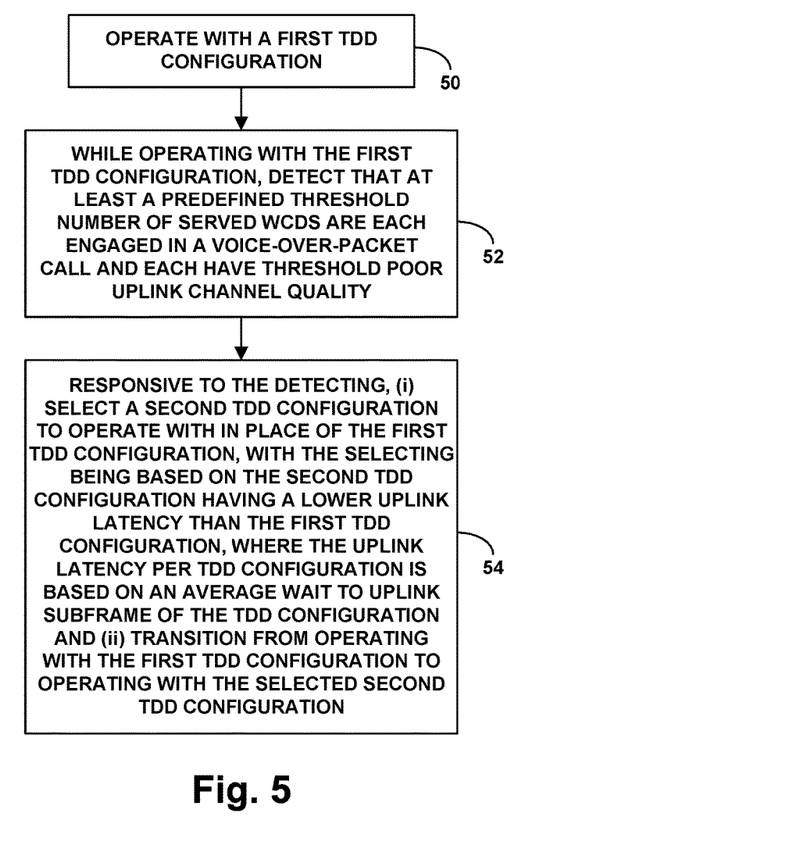
FIG. 5 is another flow chart depicting operations that can be carried out in accordance with the disclosure.

FIG. 5 is next a flow chart depicting operations that could be carried out in accordance with an example method for controlling air interface communication in a wireless communication system, where the system includes a base station and supports at least seven distinct time-division-duplex (TDD) configurations each defining a respective sequence of uplink and downlink subframes per recurring air interface frame.

As shown in FIG. 5, at block 50, the method includes the base station operating with a first one of the TDD configurations. Further, at block 52, the method includes, while operating with the first TDD configuration, the base station detecting that at least a predefined threshold number of WCDs served by the base station are each engaged in a voice-over-packet call and each have threshold poor uplink channel quality. And at block 54, the method includes, responsive to the detecting, (i) the base station selecting a second one of the TDD configurations to operate with in place of the first TDD configuration, with the selecting being based on the second TDD configuration having a lower uplink latency than the first TDD configuration, where the uplink latency per TDD configuration is based on an average wait to uplink subframe of the TDD configuration and (ii) the base station transitioning from operating with the first TDD configuration to operating with the selected second TDD configuration. Various features described above could be applied in the context of this method as well.

Figure 6:
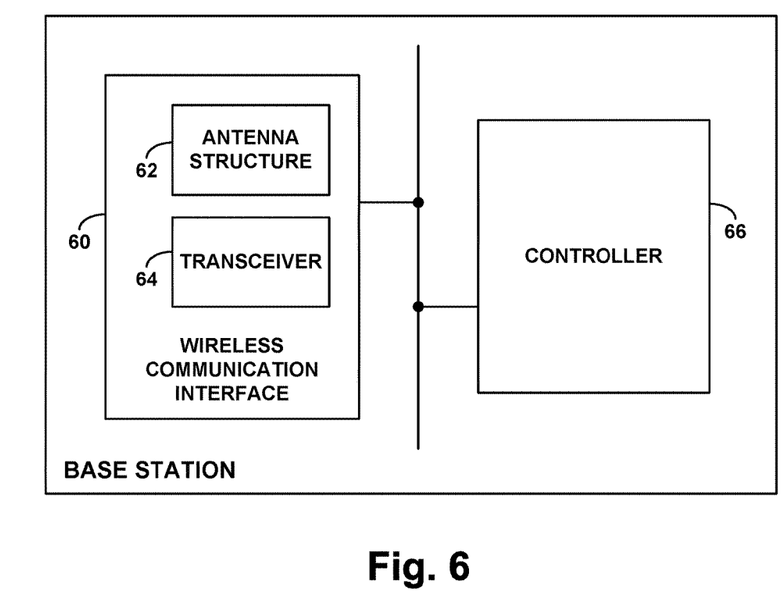
FIG. 6 is a simplified block diagram of a base station operable in accordance with the disclosure.

Finally, FIG. 6 is a simplified block diagram of a base station that could be configured to operate in accordance with the present disclosure, to control air interface communication. This base station could take various forms, examples of which include a macro base station, a small cell base station, a repeater, or the like. As shown in FIG. 6, the base station includes a wireless communication interface 60 comprising an antenna structure 62 and transceiver 64 that are cooperatively configured to provide a cell in which to serve WCDs, where the cell operates with a first TDD configuration defining a first sequence of uplink and downlink subframes for communication between the base station and one or more WCDs that would operate in the cell.

Further, the base station includes a controller (e.g., a processing unit, non-transitory data storage, and program instructions stored in the data storage and executable by the processor), possibly integrated with the wireless communication interface, which is operable to carry out features such as those noted above. In particular, by way of example, the controller could operate to detect a trigger for reducing uplink latency in the cell and, responsive to detecting the trigger, (i) to select a second TDD configuration based on the second TDD configuration having lower uplink latency than the first TDD configuration, where the second TDD configuration defines a second sequence of uplink and downlink subframes for communication between the base station and one or more WCDs that would operate in the cell, the second sequence being different than the first sequence, and where the uplink latency of each TDD configuration is based on average wait to uplink subframe of the TDD configuration, and (ii) to reconfigure the cell to operate with the second TDD configuration instead of the first TDD configuration. Moreover, various features described above could be applied here as well.

Exemplary embodiments have been described above. Those skilled in the art will understand, however, that changes and modifications may be made to these embodiments without departing from the true scope and spirit of the invention.

We claim:

1. A method for controlling air interface communication in a cell of a base station, wherein the cell operates with a first time-division-duplex (TDD) configuration defining a first sequence of uplink and downlink subframes for communication between the base station and wireless client devices (WCDs) operating in the cell, the method comprising:

detecting a trigger for reducing uplink latency in the cell; and responsive to detecting the trigger, (i) selecting a second TDD configuration based on the second TDD configuration having lower uplink latency than the first TDD configuration, wherein the uplink latency of each TDD configuration is based on average wait to uplink subframe of the TDD configuration, and (ii) reconfiguring the cell to operate with the second TDD configuration instead of the first TDD configuration, wherein the base station is provisioned with data that indicates respectively for each TDD configuration of the first and second TDD configurations a measure of the uplink latency of the TDD configuration, and wherein selecting the second TDD configuration is based on a comparison of the indicated measure of uplink latency of the second TDD configuration with the indicated measure of uplink latency of the first TDD configuration.

2. The method of claim 1, wherein the detecting, selecting, and reconfiguring are done by the base station.

3. The method of claim 1, wherein detecting the trigger for reducing uplink latency in the cell comprises detecting at least a predefined threshold level of latency-sensitive communication in the cell.

4. The method of claim 3, wherein detecting at least the predefined threshold level of latency-sensitive communication in the cell comprises detecting at least a predefined threshold number of voice-over-packet calls being served in the cell.

5. The method of claim 1, wherein detecting the trigger for reducing uplink latency in the cell comprises detecting that the base station is serving at least a predefined threshold number of WCDs that are engaged in voice-over-packet service and that have channel quality lower than a predefined threshold channel quality.

6. The method of claim 1, wherein the base station operates according to an air interface protocol that defines at least three distinct TDD configurations, wherein the first TDD configuration and second TDD configuration are each one of the at least three distinct TDD configurations.

7. The method of claim 6, wherein the selecting is based on the second TDD configuration having a lowest indicated measure of uplink latency of all of the TDD configurations.

8. A method for controlling air interface communication in a wireless communication system, wherein the wireless communication system includes a base station and supports at least seven distinct time-division-duplex (TDD) configurations each defining a respective sequence of uplink and downlink subframes per recurring air interface frame, the method comprising:

operating by the base station with a first one of the TDD configurations;

while operating with the first TDD configuration, detecting by the base station that at least a predefined threshold number of wireless client devices (WCDs) served by the base station are each engaged in a voice-over-packet call and each have threshold poor uplink channel quality; and responsive to the detecting, (i) selecting by the base station a second one of the TDD configurations to operate with in place of the first TDD configuration, wherein the selecting is based on the second TDD configuration having a lower uplink latency than the first TDD configuration, wherein the uplink latency per TDD configuration is based on an average wait to uplink subframe of the TDD configuration and (ii) transitioning by the base station from operating with the first TDD configuration to operating with the selected second TDD configuration, wherein the base station is provisioned with data that indicates respectively for each of the TDD configurations a measure of the uplink latency of the TDD configuration, and wherein selecting the second TDD configuration is based on a comparison of the indicated measure of uplink latency of the second TDD configuration with the indicated measure of uplink latency of the first TDD configuration.

9. The method of claim 8, wherein the selecting is based on the second TDD configuration having a lowest indicated measure of uplink latency of all of the TDD configurations.

10. A base station configured to control air interface communication, the base station comprising:

an antenna structure and transceiver cooperatively configured to provide a cell in which to serve wireless client devices (WCDs), wherein the cell operates with a first time-division-duplex (TDD) configuration defining a first sequence of uplink and downlink subframes for communication between the base station and one or more WCDs that would operate in the cell;

a controller operable to detect a trigger for reducing uplink latency in the cell and, responsive to detecting the trigger, (i) to select a second TDD configuration based on the second TDD configuration having lower uplink latency than the first TDD configuration, wherein the second TDD configuration defines a second sequence of uplink and downlink subframes for communication between the base station and one or more WCDs that would operate in the cell, the second sequence being different than the first sequence, and wherein the uplink latency of each TDD configuration is based on average wait to uplink subframe of the TDD configuration, and (ii) to reconfigure the cell to operate with the second TDD configuration instead of the first TDD configuration, wherein the base station is provisioned with data that indicates respectively for each TDD configuration of the first and second TDD configurations a measure of the uplink latency of the TDD configuration, and wherein selecting the second TDD configuration is based on a comparison of the indicated measure of uplink latency of the second TDD configuration with the indicated measure of uplink latency of the first TDD configuration.

11. The base station of claim 10, wherein the controller comprises a processing unit, data storage, and program instructions stored in the data storage and executable by the processing unit to carry out the detecting, the selecting, and the reconfiguring.

12. The base station of claim 10, wherein detecting the trigger for reducing uplink latency in the cell comprises detecting at least a predefined threshold level of latency-sensitive communication in the cell.

13. The base station of claim 12, wherein detecting at least the predefined threshold level of latency-sensitive communication in the cell comprises detecting at least a predefined threshold number of voice-over-packet calls being served in the cell.

14. The base station of claim 10, wherein detecting the trigger for reducing uplink latency in the cell comprises detecting that the base station is serving at least a predefined threshold number of WCDs that are engaged in voice-over-packet service and that have channel quality lower than a predefined threshold channel quality.

15. The base station of claim 10, wherein the base station operates according to an air interface protocol that defines at least three distinct TDD configurations, wherein the first TDD configuration and second TDD configuration are each one of the at least three distinct TDD configurations.

16. The base station of claim 15, wherein the selecting is based on the second TDD configuration having a lowest indicated measure of uplink latency of all of the TDD configurations.

17. The base station of claim 10, wherein the base station supports at least three distinct TDD configurations each defining a respective sequence of uplink and downlink subframes per recurring air interface frame, and wherein the first TDD configuration and second TDD configuration are each one of the at least three distinct TDD configurations.

* * * * *